US011925958B2

(12) United States Patent
Ahmed et al.

(10) Patent No.: US 11,925,958 B2
(45) Date of Patent: Mar. 12, 2024

(54) SYSTEM AND METHOD FOR LOCKING A WEIGHT ASSEMBLY

(71) Applicant: Schlumberger Technology Corporation, Sugar Land, TX (US)

(72) Inventors: Muneeb Ahmed, Florence, KY (US); Robert Lunnemann, Florence, KY (US); James McCoy, Florence, KY (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 157 days.

(21) Appl. No.: 17/637,827

(22) PCT Filed: Aug. 6, 2020

(86) PCT No.: PCT/US2020/045190
§ 371 (c)(1),
(2) Date: Feb. 24, 2022

(87) PCT Pub. No.: WO2021/040995
PCT Pub. Date: Mar. 4, 2021

(65) Prior Publication Data
US 2022/0280975 A1    Sep. 8, 2022

Related U.S. Application Data

(60) Provisional application No. 62/894,154, filed on Aug. 30, 2019.

(51) Int. Cl.
*B07B 1/28*    (2006.01)
*F16B 2/02*    (2006.01)

(52) U.S. Cl.
CPC ............... *B07B 1/284* (2013.01); *F16B 2/02* (2013.01)

(58) Field of Classification Search
None
See application file for complete search history.

(56) References Cited

U.S. PATENT DOCUMENTS

| 3,863,765 | A | * | 2/1975 | Gray | ................... B07B 1/528 209/390 |
| 5,134,893 | A | | 8/1992 | Hukki et al. | |
| 6,401,933 | B1 | | 6/2002 | Cohen et al. | |
| 2007/0084762 | A1 | | 4/2007 | Mainwaring et al. | |

(Continued)

FOREIGN PATENT DOCUMENTS

WO    2018080852 A1    5/2018

OTHER PUBLICATIONS

International Search Report and Written Opinion issued in International Patent application PCT/US2020/045190 dated Nov. 18, 2020, 9 pages.

(Continued)

*Primary Examiner* — Jacob S. Scott
*Assistant Examiner* — Miraj T. Patel
(74) *Attorney, Agent, or Firm* — Jeffrey D. Frantz

(57) ABSTRACT

A lock assembly for a vibratory separator includes a latch. The latch includes a first inner protrusion and a first outer protrusion. The first outer protrusion defines a first outer protrusion opening. The lock assembly also includes a first spacer. The first spacer includes a first fastener that is configured to be inserted into the first outer protrusion opening.

20 Claims, 5 Drawing Sheets

(56) References Cited

U.S. PATENT DOCUMENTS

2016/0230802 A1\* 8/2016 Emmerich ................ F16B 2/18
2016/0339477 A1   11/2016 McLean
2020/0047217 A1\* 2/2020 Lunnemann ............ B06B 1/161

OTHER PUBLICATIONS

International Preliminary Report on Patentability issued in International Patent application PCT/US2020/045190 dated Mar. 10, 2022, 6 pages.

\* cited by examiner

SYSTEM AND METHOD FOR LOCKING A WEIGHT ASSEMBLY

CROSS-REFERENCE TO RELATED APPLICATIONS

This application is the National Stage Entry of International Application No. PCT/US2020/045190, filed Aug. 6, 2020, which claims the benefit of U.S. Provisional Application No. 62/894,154, filed Aug. 30, 2019, which is incorporated by reference in its entirety.

BACKGROUND

Vibratory separators are used to separate solid particles from fluids and/or to separate solid particles of different sizes from one another. In the oil and gas industry, vibratory separators, such as shale shakers, are used to remove cuttings and other solid particles from used drilling fluid (e.g., mud) that is returned from a wellbore.

A vibratory separator includes a motor that generates rotary motion. An eccentric weight assembly is coupled to the motor to convert at least a portion of the rotary motion into vibratory motion, which facilitates the separation process. The vibratory motion may also inadvertently have the effect of creating relative motion between two or more portions of the weight assembly, which may create a spark. A wellsite where the vibratory separator is employed may include gases or liquids that may ignite in response to such a spark. Therefore, it would be desirable to have a system and method for preventing relative motion within the weight assembly to prevent the creation of a spark.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A lock assembly for a vibratory separator is disclosed. The lock assembly includes a latch. The latch includes a first inner protrusion and a first outer protrusion. The first outer protrusion defines a first outer protrusion opening. The lock assembly also includes a first spacer including a first fastener that is configured to be inserted into the first outer protrusion opening.

A system is also disclosed. The system includes a weight assembly. The weight assembly includes a weight arm defining a first weight arm opening. The weight assembly also includes an upper weight plate and a lower weight plate. The weight arm is positioned at least partially between the upper weight plate and the lower weight plate. The system also includes a lock assembly. The lock assembly includes a latch. The latch includes a first inner protrusion configured to be inserted into the first weight arm opening, and a first outer protrusion that defines a first outer protrusion opening. The lock assembly also includes a first spacer configured to be positioned within a first recess defined at least partially between the upper weight plate and the lower weight plate. The first spacer includes a first fastener that is configured to be inserted into the first outer protrusion opening.

A method is also disclosed. The method includes positioning a first spacer at least partially within a first recess defined between an upper weight plate and a lower weight plate. The first spacer comprises a first fastener. The method also includes inserting a second fastener at least partially through a first spacer opening in the first spacer. The method also includes positioning a latch such that the first fastener extends through a first outer protrusion opening in the latch. The latch includes a first outer protrusion that defines the first outer protrusion opening. The method also includes moving the latch in a first direction to align a first inner protrusion of the latch with a first weight arm opening in a weight arm. The weight arm is positioned at least partially between the upper weight plate and the lower weight plate. The method also includes moving the latch in a second direction to insert the first inner protrusion at least partially into the first weight arm opening.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Figure 1:
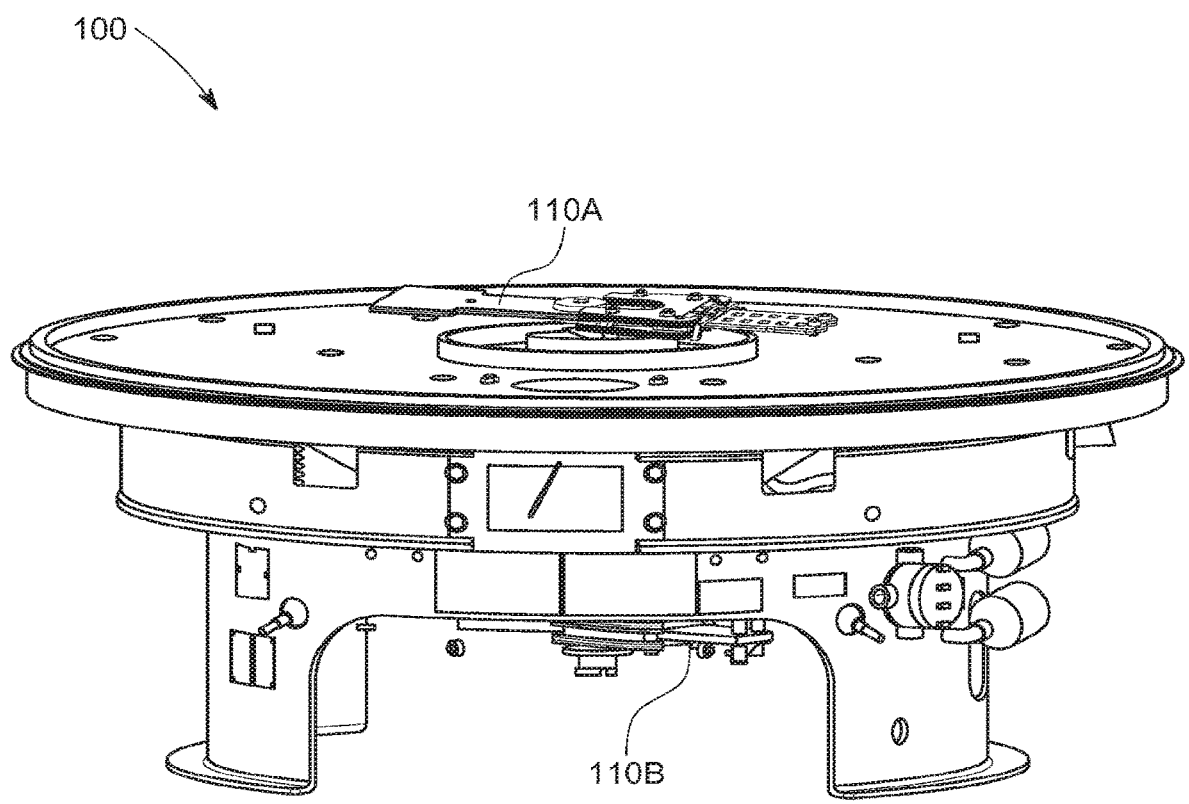
FIG. 1 is a perspective view of a vibratory separator, according to one or more examples of the disclosure.

FIG. 1 is a perspective view of a vibratory separator 100, according to one or more examples of the disclosure. The vibratory separator 100 may be a vibratory shaker, such as a shale shaker, used in the oilfield industry to process wellbore fluids. The vibratory separator 100 may also or instead be used in the food industry, cleaning industry, waste water treatment industry, and others. As shown, the vibratory separator 100 may include a first (e.g., upper) weight assembly 110A and a second (e.g., lower) weight assembly 110B. The first and second weight assemblies 110A, 110B may be the same or may be different from one another.

Figure 2:
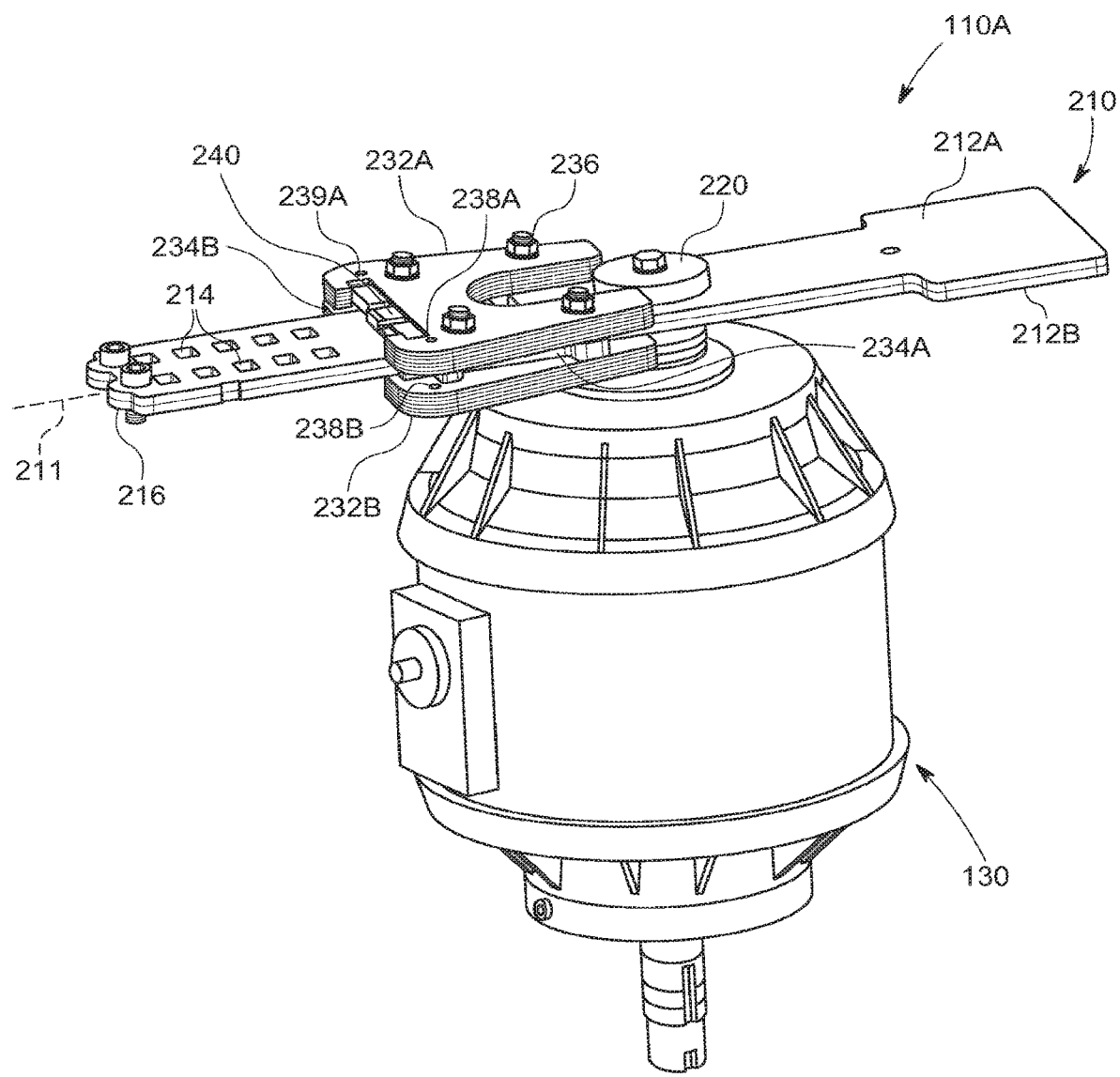
FIG. 2 is a perspective view of a motor and a weight assembly of the vibratory separator of FIG. 1, with the remainder of the vibratory separator removed for clarity, according to one or more examples of the disclosure.

FIG. 2 is a perspective view of a motor 130 of the vibratory separator 100 with the first weight assembly 110A coupled thereto, according to one or more examples of the disclosure. The remainder of the vibratory separator 100 shown in FIG. 1 has been removed for clarity.

The first weight assembly 110A may include a weight arm 210. The weight arm 210 may include a first (e.g., upper) arm 212A and a second (e.g., lower) arm 212B that are coupled (e.g., welded) together. The weight arm 210 may define a plurality of openings (referred to as weight arm openings) 214 extending at least partially therethrough. For example, the weight arm openings 214 may extend from an upper surface of the upper arm 212A to a lower surface of the lower arm 212B. At least some of the weight arm openings 214 may be longitudinally-offset from one another with respect to a central longitudinal axis 211 that extends through the weight arm 210. As shown, in one embodiment, the weight arm openings 214 may be arranged in two longitudinal rows.

The first weight assembly 110A may also include a hub 220 that couples the first weight assembly 110A to the motor 130. More particularly, the hub 220 may couple the weight arm 210 to a shaft of the motor 130.

The first weight assembly 110A may also include a first (e.g., upper) weight plate 232A and a second (e.g., lower) weight plate 232B. The weight arm 210 may be positioned at least partially between the upper and lower weight plates 232A, 232B. More particularly, the upper weight plate 232A may be positioned above and/or in contact with the upper surface of the upper arm 212A, and the lower weight plate 232B may be positioned below and/or in contact with the lower surface of the lower arm 212B. As a result, a first recess 234A and a second recess 234B may be defined between the upper and lower weight plates 232A, 232B and laterally-outward from opposing sides of the weight arm 210. The upper and lower weight plates 232A, 232B may be coupled together via one or more fasteners (four are shown: 236). The fasteners 236 may be or include screws, bolts, or the like.

In addition, the upper and lower weight plates 232A, 232B may each define one or more openings extending at least partially therethrough. For example, the upper weight plate 232A may define two upper weight plate openings 238A, 239A that extend from the upper surface thereof to the lower surface thereof, and the two upper weight plate openings 238A, 239A may be positioned proximate to opposing lateral sides of the upper weight plate 232A such that the weight arm 210 is configured to be positioned therebetween. Similarly, the lower weight plate 232B may define two lower weight plate openings (one is shown: 238B) that extend from the upper surface thereof to the lower surface thereof, and the two lower weight plate openings 238B may be positioned proximate to opposing lateral sides of the lower weight plate 232B such that the weight arm 210 is configured to be positioned therebetween. Each of the upper weight plate openings 238A, 239A in the upper weight plate 232A may be configured to be aligned with a corresponding lower weight plate opening 238B in the lower weight plate 232B, and the weight arm 210 may not obstruct a line of sight through the aligned openings (e.g., openings 238A, 238B).

The position of the upper and lower weight plates 232A, 232B along the weight arm 210 may affect the amount (e.g., amplitude and/or force) of vibratory motion generated by the vibratory separator 100. For example, as the upper and lower weight plates 232A, 232B are moved toward a distal end 216 of the weight arm 210, the amount of force generated by the vibratory motion increases. Once the desired position of the upper and lower weight plates 232A, 232B is selected with respect to the weight arm 210, the upper and lower weight plates 232A, 232B may be coupled to the weight arm 210 via a weight lock 240. More particularly, the weight lock 240 may be coupled to or integral with the upper and lower weight plates 232A, 232B and extend at least partially into and/or through one or more of the weight arm openings 214 in the weight arm 210. This may help to prevent the upper and lower weight plates 232A, 232B from moving longitudinally and/or laterally relative to the weight arm 210.

However, as mentioned above, one or more portions of the first weight assembly 110A may still move relative to one another. To reduce or prevent such movement between the one or more portions of the first weight assembly 110A, a lock assembly may be coupled to the first weight assembly 110A.

Figure 3:
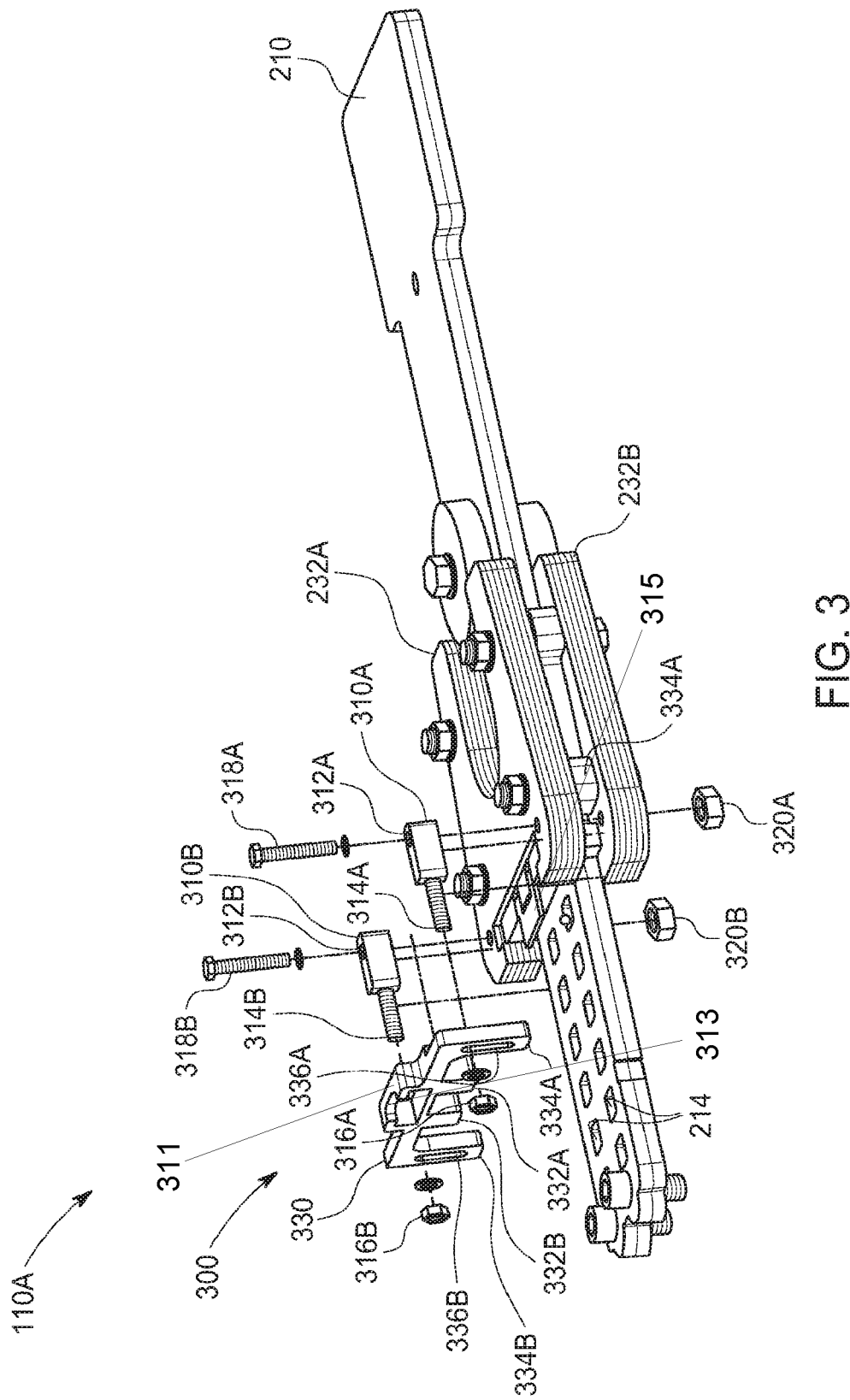
FIG. 3 is a perspective view of the weight assembly of FIG. 2 with an exploded lock assembly, according to one or more examples of the disclosure.

FIG. 3 is a perspective view of the first weight assembly 110A with an exploded lock assembly 300, according to one or more examples of the disclosure. The lock assembly 300 may include a first spacer 310A and a second spacer 310B. The first spacer 310A may be configured to be inserted into the first recess 234A, and the second spacer 310B may be configured to be inserted into the second recess 234B (not shown in FIG. 3; see FIG. 2). The first spacer 310A may define an opening (referred to as a first spacer opening) 312A that extends at least partially therethrough. Similarly, the second spacer 310B may define an opening (referred to as a second spacer opening) 312B that extends at least partially therethrough. The first spacer 310A may include a first fastener 314A coupled thereto or integral therewith. Similarly, the second spacer 310B may include a second fastener 314B coupled thereto or integral therewith. The fasteners 314A, 314B may be or include threaded rods, bolts, or screws. Central longitudinal axes through the openings 312A, 312B may be substantially perpendicular with central longitudinal axes through the fasteners 314A, 314B. Each fastener 314A, 314B may have a corresponding nut 316A, 316B that is configured to be coupled thereto.

The lock assembly 300 may also include a third fastener 318A and a fourth fastener 318B. The fasteners 318A, 318B may be or include bolts or screws (e.g., hex head screws). The third fastener 318A may be configured to be inserted at least partially into the first spacer opening 312A. Similarly, the fourth fastener 318B may be configured to be inserted at least partially into the second spacer opening 312B. Each fastener 318A, 318B may have a corresponding nut 320A, 320B that is configured to be coupled thereto.

The lock assembly 300 may also include a latch 330. The latch 330 may include a first inner protrusion 332A and a second inner protrusion 332B. The inner protrusions 332A, 332B may extend in a downward direction and be configured to be inserted at least partially into corresponding weight arm openings 214 in the weight arm 210. The lock assembly 300 may also include top central protrusion 311 defining a top central protrusion opening 313. The top central protrusion opening 313 may be configured to receive a central tab 315, extending out of the upper weight plate 232A in a direction parallel to the weight arm 210.

The latch 330 may also include a first outer protrusion 334A and a second outer protrusion 334B. The outer protrusions 334A, 334B may also extend in a downward direction and be positioned laterally-outward from the weight arm 210. The outer protrusions 334A, 334B may define openings (referred to as outer protrusion openings) 336A, 336B at least partially therethrough. The first outer protrusion opening 336A may be configured to be aligned with the first spacer 310A, such that the first fastener 314A may extend at least partially through the first outer protrusion opening 336A. Similarly, the second outer protrusion opening 336B may be configured to be aligned with the second spacer 310B, such that the second fastener 314B may extend at least partially through the second outer protrusion opening 336B.

Figure 4:
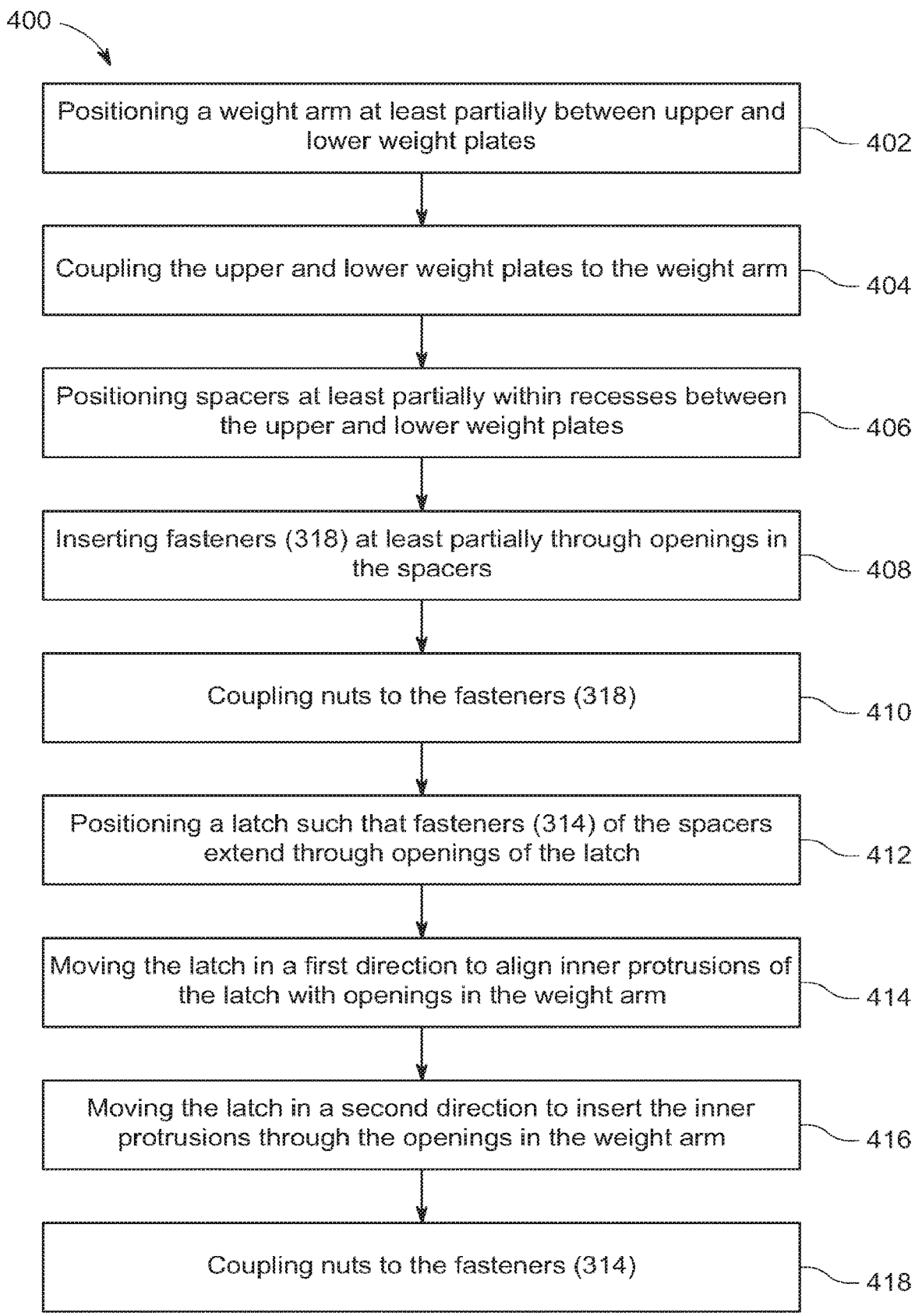
FIG. 4 is a flowchart of a method for assembling the vibratory separator, according to one or more examples of the disclosure.

FIG. 4 is a flowchart of a method 400 for assembling the vibratory separator 100, according to one or more examples of the disclosure. More particularly, the method 400 is directed to coupling the lock assembly 300 to the first weight assembly 110A. An illustrative order of the method 400 is provided below; however, one or more portions of the method 400 may be performed in a different order, combined, or omitted. To prevent redundancy, the method 400 is described with respect to the first weight assembly 110A; however, as will be appreciated, the method 400 may also or instead be directed to coupling the lock assembly 300 (or a second lock assembly) to the second weight assembly 110B.

The method 400 may include positioning the weight arm 210 at least partially between the upper and lower weight plates 232A, 232B, as at 402. As mentioned above, the longitudinal position of the upper and lower weight plates 232A, 232B along the weight arm 210 may affect the vibratory motion generated by the vibratory separator 100.

The method 400 may also include coupling the upper and lower weight plates 232A, 232B to the weight arm 210, as at 404. As mentioned above, the upper and lower weight plates 232A, 232B may be coupled to the weight arm 210 via the weight lock 240.

The method 400 may also include positioning the spacers 310A, 310B at least partially within the recesses 234A, 234B between the upper and lower weight plates 232A, 232B, as at 406. More particularly, the first spacer 310A may be positioned within the first recess 234A such that the first spacer opening 312A in the first spacer 310A is aligned with the first upper weight plate opening 238A in the upper weight plate 232A and the first lower weight plate opening 238B in the lower weight plate 232B. Similarly, the second spacer 310B may be positioned within the second recess 234B such that the second spacer opening 312B in the second spacer 310B is aligned with the second upper weight plate opening 239A in the upper weight plate 232A and the second lower weight plate opening (not shown) in the lower weight plate 232B.

The method 400 may also include inserting the fasteners 318A, 318B at least partially through the openings 312A, 312B in the spacers 310A, 310B, as at 408. More particularly, the fastener 318A may be inserted through the first upper weight plate opening 238A in the upper weight plate 232A, the first spacer opening 312A in the first spacer 310A, and the first lower weight plate opening 238B in the lower weight plate 232B. Similarly, the fastener 318B may be inserted through the second upper weight plate opening 239A in the upper weight plate 232A, the second spacer opening 312B in the second spacer 310B, and the second lower weight plate opening (not shown) in the lower weight plate 232B.

The method 400 may also include coupling the nuts 320A, 320B to the fasteners 318A, 318B, as at 410. More particularly, the first nut 320A may be coupled to the distal end of the fastener 318A proximate to the lower surface of the lower weight plate 232B. Similarly, the second nut 320B may be coupled to the distal end of the fastener 318B proximate to the lower surface of the lower weight plate 232B.

The method 400 may also include positioning the latch 330 such that the fasteners 314A, 314B extend through the openings 336A, 336B of the latch 330, as at 412. As shown, the first and second outer protrusion openings 336A, 336B may be elongated in a vertical direction. The fastener 314A may be inserted into the first outer protrusion opening 336A proximate to a lower end of the first outer protrusion opening 336A. Similarly, the fastener 314B may be inserted into the second outer protrusion opening 336B proximate to a lower end of the second outer protrusion opening 336B.

The method 400 may also include moving the latch 330 in a first direction to align the inner protrusions 332A, 332B with two of the openings 214 in the weight arm 210, as at 414. This may include moving the latch 330 longitudinally/horizontally with respect to central longitudinal axis 211 of the weight arm 210 and the fasteners 314A, 314B. The fastener 314A may remain extending through the first outer protrusion opening 336A while the latch 330 moves in the first direction. The fastener 314B may also remain extending through the second outer protrusion opening 336B while the latch 330 moves in the first direction.

The method 400 may also include moving the latch 330 in a second direction to insert the inner protrusions 332A, 332B through the two of the openings 214 in the weight arm 210, as at 416. This may include moving the latch 330 vertically (e.g., downward) with respect to the weight arm 210 and the fasteners 314A, 314B. The fastener 314A may remain extending through first outer protrusion opening 336A while the latch 330 moves in the second direction. The fastener 314B may also remain extending through second outer protrusion opening 336B while the latch 330 moves in the second direction. The first and second directions may be substantially perpendicular to one another. As mentioned above, the first and second outer protrusion openings 336A, 336B in the latch 330 may be elongated in a vertical direction. Thus, when the latch 330 moves downward, the fastener 314A may move upward within the first outer protrusion opening 336A, and the fastener 314B may move upward within the second outer protrusion opening 336B.

Figure 5:
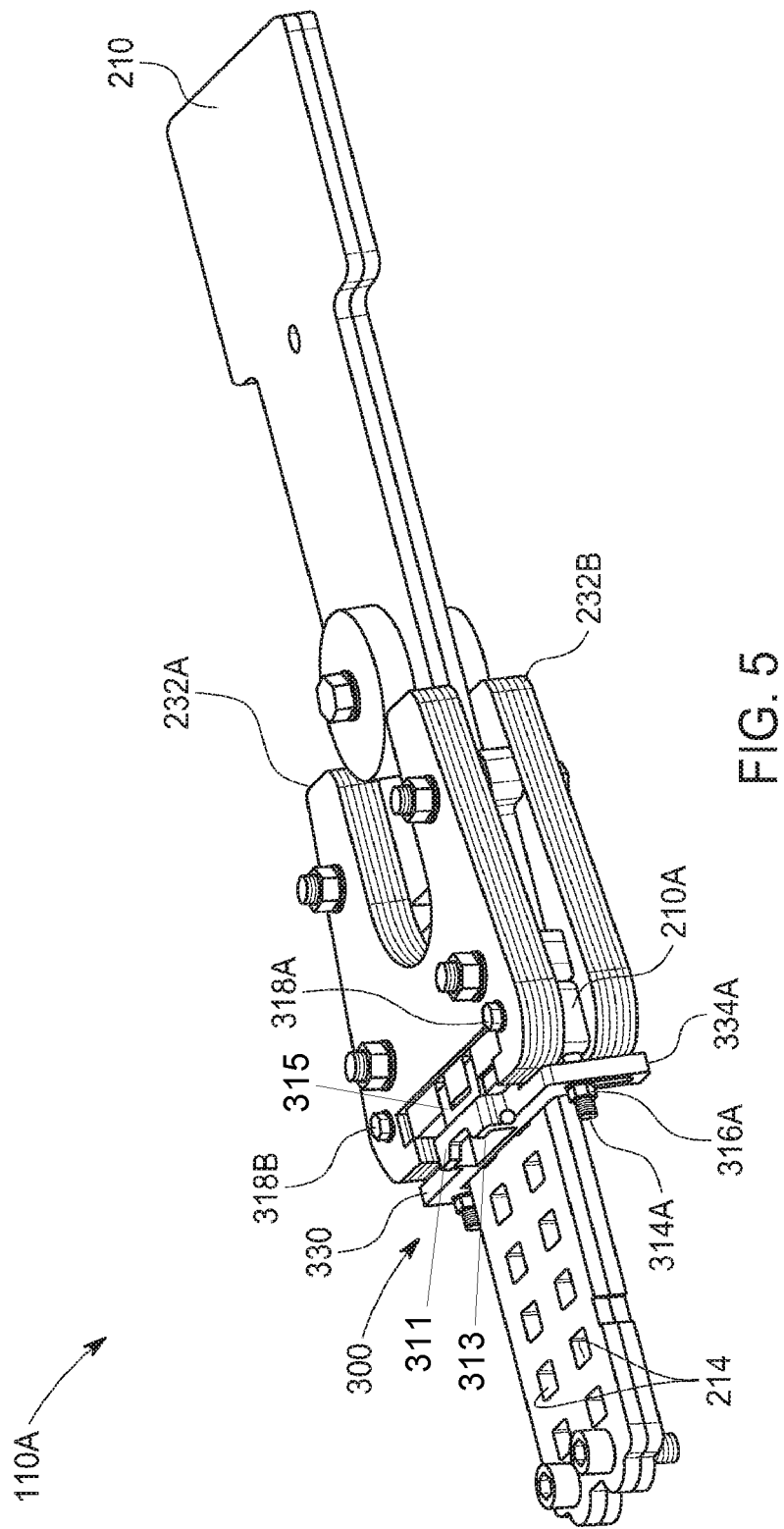
FIG. 5 is a perspective view of the weight assembly with the lock assembly coupled thereto, according to one or more examples of the disclosure.

The method 400 may also include coupling the nuts 316A, 316B to the fasteners 314A, 314B, as at 418. More particularly, the first nut 316A may be coupled to the distal end of the fastener 314A proximate to an outer surface of the latch 330. Similarly, the second nut 316B may be coupled to the distal end of the fastener 314B proximate to the outer surface of the latch 330. At this point, latch 330 may be positioned and secured between the first and second nuts 316A, 316B on one side, and the upper and lower weight plates 232A, 232B and the first and second spacers 310A, 310B on the other side. Thus, the lock assembly 300 is coupled to the first weight assembly 110A, which is shown in FIG. 5.

Coupling the lock assembly 300 to the first weight assembly 110A may help to reduce or prevent movement between two or more portions of the first weight assembly 110A. For example, this may help to reduce or prevent movement between the upper weight plate 232A and the weight arm 210, between the upper weight plate 232A and the hub 220, between the lower weight plate 232B and the weight arm 210, between the lower weight plate 232B and the hub 220, or a combination thereof. Reducing or preventing movement between two or more of the portions of the first weight assembly 110A may reduce or prevent the likelihood that a spark will be generated due to such movement.

In a first example, a lock assembly 300 for a vibratory separator 100 is disclosed. The lock assembly 300 includes a latch 330. The latch 330 includes a first inner protrusion 332A and a first outer protrusion 334A. The first outer protrusion 334A defines a first outer protrusion opening 336A. The lock assembly 300 also includes a first spacer 310A that includes a first fastener 314A that is configured to be inserted into the first outer protrusion opening 336A.

In a second example that may be independent from or build upon example 1, the first inner protrusion 332A is configured to be inserted into a first weight arm opening 214 in a weight arm 210.

In a third example that may be independent from or build upon the example 1 and/or example 2, the first outer protrusion 334A is configured to be positioned laterally-offset from or laterally-abutting the weight arm 210 when the first inner protrusion 332A is inserted into the first weight arm opening 214.

In a fourth example that may be independent from or build upon any combination of examples 1-3, the latch 330 further includes a second inner protrusion 332B. The second inner protrusion 332B is configured to be inserted into a second weight arm opening 214 in the weight arm 210. The latch 330 also includes a second outer protrusion 334B. The first inner protrusion 332A and the second inner protrusion 332B are positioned between the first outer protrusion 334A and the second outer protrusion 334B. The weight arm 210 is configured to be positioned between the first outer protrusion 334A and the second outer protrusion 334B when the second inner protrusion 332B is inserted into the second weight arm opening 214. The second outer protrusion 334B defines a second outer protrusion opening 336B.

In a fifth example that may be independent from or build upon any combination of examples 1-4, the lock assembly also includes a second spacer 310B including a second fastener 314B that is configured to be inserted into the second outer protrusion opening 336B.

In a sixth example that may be independent from or build upon any combination of examples 1-5, the first outer protrusion opening 336A is elongated to allow the first fastener 314A to move (e.g., vertically) within first outer protrusion opening 336A.

In a seventh example that may be independent from or build upon any combination of examples 1-6, the first spacer 310A defines a first spacer opening 312A that is substantially perpendicular to the first fastener 314A.

In an eighth example that may be independent from or build upon any combination of examples 1-7, the lock assembly 300 includes a third fastener 318A that is configured to be inserted into the first spacer opening 312A, such that the third fastener 318A is substantially perpendicular to the first fastener 314A.

In a ninth example that may be independent from or build upon any combination of examples 1-8, a system is also disclosed. The system includes a weight assembly 110A. The weight assembly 110A includes a weight arm 210 defining a first weight arm opening 214. The weight assembly 110A also includes an upper weight plate 232A and a lower weight plate 232B. The weight arm 210 is positioned at least partially between the upper weight plate 232A and the lower weight plate 232B. The system also includes a lock assembly 300. The lock assembly 300 includes a latch 330. The latch 330 includes a first inner protrusion 332A configured to be inserted into the first weight arm opening 214. The latch 330 also includes a first outer protrusion 334A that defines a first outer protrusion opening 336A. The lock assembly 300 also includes a first spacer 310A configured to be positioned within a first recess 234A defined at least partially between the upper weight plate 232A and the lower weight plate 232B. The first spacer 310A includes a first fastener 314A that is configured to be inserted into the first outer protrusion opening 336A.

In a tenth example that may be independent from or build upon any combination of examples 1-9, the first outer protrusion 334A is configured to be positioned laterally-offset from or laterally-abutting the weight arm 210 when the first inner protrusion 332A is inserted into the first weight arm opening 214.

In an eleventh example that may be independent from or build upon any combination of examples 1-10, the first outer protrusion opening 336A is elongated to allow the first fastener 314A to move within the first outer protrusion opening 336A.

In a twelfth example that may be independent from or build upon any combination of examples 1-11, the first spacer 310A defines a first spacer opening 312A that is substantially perpendicular to the first fastener 314A. The lock assembly 300 also includes a third fastener 318A that is configured to be inserted into the first spacer opening 312A, such that the third fastener 318A is substantially perpendicular to the first fastener 314A.

In a thirteenth example that may be independent from or build upon any combination of examples 1-12, the latch 330 further includes a second inner protrusion 332B. The second inner protrusion 332B is configured to be inserted into a second weight arm opening 214 in the weight arm 210. The latch 330 further includes a second outer protrusion 334B. The first inner protrusion 332A and the second inner protrusion 332B are positioned between the first outer protrusion 334A and the second outer protrusion 334B. The weight arm 210 is positioned between the first outer protrusion 334A and the second outer protrusion 334B when the second inner protrusion 332B is inserted into the second weight arm opening 214. The second outer protrusion 334B defines a second outer protrusion opening 336B.

In a fourteenth example that may be independent from or build upon any combination of examples 1-13, a method is also disclosed. The method includes positioning a first spacer 310A at least partially within a first recess 234A defined between an upper weight plate 232A and a lower weight plate 232B. The first spacer 310A includes a first fastener 314A. The method also includes inserting a third fastener 318A at least partially through a first spacer opening 312A in the first spacer 310A. The method also includes positioning a latch 330 such that the first fastener 314A extends through a first outer protrusion opening 336A in the latch 330. The latch 330 includes a first outer protrusion 334A that defines the first outer protrusion opening 336A. The method also includes moving the latch 330 in a first direction to align a first inner protrusion 332A of the latch 330 with a first weight arm opening 214 in a weight arm 210. The weight arm 210 is positioned at least partially between the upper weight plate 232A and the lower weight plate 232B. The method also includes moving the latch 330 in a second direction to insert the first inner protrusion 332A at least partially into the first weight arm opening 214.

In a fifteenth example that may be independent from or build upon any combination of examples 1-14, the upper weight plate 232A defines an upper weight plate opening 238A. The lower weight plate 232B defines a lower weight plate opening 238B. Positioning the first spacer 310A comprises aligning the first spacer opening 312A with the upper weight plate opening 238A and the lower weight plate opening 238B.

In a sixteenth example that may be independent from or build upon any combination of examples 1-15, inserting the third fastener 318A includes inserting the third fastener 318A through the upper weight plate opening 238A, the first spacer opening 312A, and the lower weight plate opening 238B.

In a seventeenth example that may be independent from or build upon any combination of examples 1-16, the third fastener 318A is substantially perpendicular to the first fastener 314A when the third fastener 318A is inserted.

In an eighteenth example that may be independent from or build upon any combination of examples 1-17, the first recess 234A is defined at least partially by the upper weight plate 232A, the lower weight plate 232B, and the weight arm 210.

In a nineteenth example that may be independent from or build upon any combination of examples 1-18, the first direction is substantially parallel to a central longitudinal axis 211 through the weight arm 210, and the second direction is substantially perpendicular to the first direction.

In a twentieth example that may be independent from or build upon any combination of examples 1-19, the first fastener 314A remains extending through the first outer protrusion opening 336A while the latch 330 is moved in the first direction and the second direction.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A lock assembly for a vibratory separator, comprising:
   a latch comprising:
      a first inner protrusion; and
      a first outer protrusion, wherein the first outer protrusion defines a first outer protrusion opening; and
   a first spacer comprising a first fastener that is configured to be inserted into the first outer protrusion opening, wherein the first outer protrusion opening is an elongated opening extending in a direction perpendicular to the first fastener.

2. The lock assembly of claim 1, wherein the first inner protrusion is configured to be inserted into a first weight arm opening in a weight arm.

3. The lock assembly of claim 2, wherein the first outer protrusion is configured to be positioned laterally-offset from or laterally-abutting the weight arm when the first inner protrusion is inserted into the first weight arm opening.

4. The lock assembly of claim 3, wherein the latch further comprises:
   a second inner protrusion, wherein the second inner protrusion is configured to be inserted into a second weight arm opening in the weight arm; and
   a second outer protrusion, wherein the first inner protrusion and the second inner protrusion are positioned between the first outer protrusion and the second outer protrusion, wherein the weight arm is configured to be positioned between the first outer protrusion and the second outer protrusion when the second inner protrusion is inserted into the second weight arm opening, and wherein the second outer protrusion defines a second outer protrusion opening.

5. The lock assembly of claim 4, further comprising a second spacer comprising a second fastener that is configured to be inserted into the second outer protrusion opening, wherein the second outer protrusion opening is an elongated opening extending in a direction perpendicular to the second fastener.

6. The lock assembly of claim 1, wherein the first spacer defines a first spacer opening that is substantially perpendicular to the first fastener.

7. The lock assembly of claim 6, further comprising a second third fastener that is configured to be inserted into the first spacer opening, such that the first fastener is substantially perpendicular to the second third fastener.

8. The lock assembly of claim 1, wherein the first spacer comprises a rectangular body configured to be positioned within a first recess defined at least partially between an upper weight plate and a lower weight plate, wherein the first spacer further comprises a cylindrical fastener protruding from the rectangular body.

9. The lock assembly of claim 1, wherein the latch further comprises a top central protrusion defining a top central protrusion opening, wherein the top central protrusion opening is configured to receive a central tab attached to an upper weight plate.

10. A system, comprising:
    a weight assembly comprising:
       a weight arm defining a first weight arm opening;
       an upper weight plate; and
       a lower weight plate, wherein the weight arm is positioned at least partially between the upper weight plate and the lower weight plate; and
    a lock assembly comprising:
       a latch comprising:
          a first inner protrusion configured to be inserted into the first weight arm opening; and
          a first outer protrusion that defines a first outer protrusion opening; and
       a first spacer configured to be positioned within a first recess defined at least partially between the upper weight plate and the lower weight plate, wherein the first spacer comprises a first fastener that is configured to be inserted into the first outer protrusion opening, wherein the first outer protrusion opening is an elongated opening extending in a direction perpendicular to the first fastener.

11. The system of claim 10, wherein the first outer protrusion is configured to be positioned laterally-offset from or laterally-abutting the weight arm when the first inner protrusion is inserted into the first weight arm opening.

12. The system of claim 10, wherein the first spacer defines a first spacer opening that is substantially perpendicular to the first fastener, and wherein the lock assembly further comprises a third fastener that is configured to be inserted into the first spacer opening, such that the first fastener is substantially perpendicular to the third fastener.

13. The system of claim 10, wherein the latch further comprises:
a second inner protrusion, wherein the second inner protrusion is configured to be inserted into a second weight arm opening in the weight arm; and
a second outer protrusion, wherein the first inner protrusion and the second inner protrusion are positioned between the first outer protrusion and the second outer protrusion, wherein the weight arm is positioned between the first outer protrusion and the second outer protrusion when the second inner protrusion is inserted into the second weight arm opening, and wherein the second outer protrusion defines a second outer protrusion opening.

14. A method, comprising:
positioning a first spacer at least partially within a first recess defined between an upper weight plate and a lower weight plate, wherein the first spacer comprises a first fastener;
inserting a third fastener at least partially through a first spacer opening in the first spacer;
positioning a latch such that the first fastener extends through a first outer protrusion opening in the latch, wherein the latch comprises a first outer protrusion that defines the first outer protrusion opening and the first outer protrusion opening is an elongated opening extending in a direction perpendicular to the first fastener;
moving the latch in a first direction to align a first inner protrusion of the latch with a first weight arm opening in a weight arm, wherein the weight arm is positioned at least partially between the upper weight plate and the lower weight plate; and
moving the latch in a second direction to insert the first inner protrusion at least partially into the first weight arm opening.

15. The method of claim 14, wherein the upper weight plate defines an upper weight plate opening, wherein the lower weight plate defines a lower weight plate opening, and wherein positioning the first spacer comprises aligning the first spacer opening with the upper weight plate opening and the lower weight plate opening.

16. The method of claim 15, wherein inserting the third fastener comprises inserting the third fastener through the upper weight plate opening, the first spacer opening, and the lower weight plate opening.

17. The method of claim 16, wherein the third fastener is substantially perpendicular to the first fastener when the third fastener is inserted.

18. The method of claim 14, wherein the first recess is defined at least partially by the upper weight plate, the lower weight plate, and the weight arm.

19. The method of claim 14, wherein the first direction is substantially parallel to a central longitudinal axis through the weight arm, and wherein the second direction is substantially perpendicular to the first direction.

20. The method of claim 14, wherein the first fastener remains extending through the first outer protrusion opening while the latch is moved in the first direction and the second direction.

\* \* \* \* \*